United States Patent
Power

(10) Patent No.: US 10,524,457 B2
(45) Date of Patent: Jan. 7, 2020

(54) FISH STRINGER ASSEMBLY

(71) Applicant: Travis J. Power, Houston, TX (US)

(72) Inventor: Travis J. Power, Houston, TX (US)

(*) Notice: Subject to any disclaimer, the term of this patent is extended or adjusted under 35 U.S.C. 154(b) by 0 days.

(21) Appl. No.: 15/926,840

(22) Filed: Mar. 20, 2018

(65) Prior Publication Data
US 2018/0263225 A1 Sep. 20, 2018

Related U.S. Application Data

(60) Provisional application No. 62/474,005, filed on Mar. 20, 2017.

(51) Int. Cl.
A01K 65/00 (2006.01)

(52) U.S. Cl.
CPC .................... A01K 65/00 (2013.01)

(58) Field of Classification Search
CPC ...................................... A01K 65/00
USPC ............................... 224/103; 43/55
See application file for complete search history.

(56) References Cited

U.S. PATENT DOCUMENTS

| | | | | |
|---|---|---|---|---|
| 2,800,263 A * | 7/1957 | Hunt | ...................... | A01K 65/00 224/103 |
| 2,852,173 A * | 9/1958 | Milner, Sr. | ............. | A01K 65/00 224/103 |
| 2,950,888 A * | 8/1960 | Cottrill | .................. | A01K 65/00 224/103 |
| 3,052,002 A * | 9/1962 | Lesher | .................. | A01K 65/00 211/119.15 |
| 3,160,336 A * | 12/1964 | Flatford | ................. | A01K 65/00 224/103 |
| 3,854,638 A * | 12/1974 | Anderson | .............. | A01K 65/00 224/103 |
| 4,238,864 A * | 12/1980 | Kealoha | .................. | B63B 22/24 242/125.3 |
| 4,328,916 A * | 5/1982 | Lucas | .................... | A01K 65/00 224/103 |
| D294,854 S * | 3/1988 | Friesz | ......................... | D22/134 |
| 4,830,244 A * | 5/1989 | Brannon | ................ | A01K 65/00 224/103 |
| 5,025,587 A * | 6/1991 | Creed | .................... | A01K 65/00 224/103 |
| 5,203,480 A * | 4/1993 | Day | ....................... | A01K 65/00 224/103 |

* cited by examiner

Primary Examiner — Corey N Skurdal
(74) Attorney, Agent, or Firm — Law Office of Jeff Williams PLLC; J. Oliver Williams

(57) ABSTRACT

A stringer assembly for the safe storage of fish caught by a fisherman includes a stringer line having a needle, a floatation device, and a holder. The stringer assembly is configured to prevent the pushing of slack in the line in a manner to dislodge the stringer line. Additionally, the stringer line is secured without clamping or tying of the stringer line. The holder is releasably coupled to a water vessel through an attachment device configured to prevent twisting of the stringer line. The needle is inserted into a portion of the holder and the stringer line is routed under a flange of the holder in a manner that binds or wedges the stringer line to the holder and prevents removal of the needle from within the holder. Because no fasteners are needed, a fisherman is capable of operating the assembly with a single hand.

17 Claims, 3 Drawing Sheets

FISH STRINGER ASSEMBLY

CLAIM OF PRIORITY

This application claims the benefit of U.S. Provisional Application No. 62/474,005, filed 20 Mar. 2017. The information contained therein is hereby incorporated by reference.

BACKGROUND

1. Field of the Invention

The present application relates generally to a fishing device, and in particular to an assembly used to string fish together in water and safely secure them to a watercraft, person, anchor, or fixture.

2. Description of Related Art

Fishing is an immensely popular past time. A choice for every fisherman is what to do with the fish after it is caught. Some choose to release the fish back into the water while others decide to keep the fish for eating. If it is determined that fish are kept, the fish need to be stored or dealt with in a suitable and clean manner. Different options are available. Where fish are not adequately cared for, a fish may begin decomposing before a fisherman can properly clean and prepare it.

How to deal with fish after being caught and prior to being cleaned and prepared are handled in different ways. Some fisherman toss fish in a cooler packed with ice. This can be a stand-alone cooler or be one incorporated into a watercraft. Those who fish from a pier or on the shore frequently use this method. Other fisherman prefer to keep the fish alive as long as possible and put the fish in a live well. However, a live well is not always available unless the fisherman is on a larger water vessel. When a small water vessel is used, large coolers and live wells are not typically an option.

A fish stringer is commonly used with these smaller water vessels to string one or more fish together and secure the fish to the side of a watercraft or vessel. These are commonly used with small boats and wade fishing. The idea is to keep the fish in the water on a line. A needle is used to route a line through the fish. The line includes a floatation device at a distal end of the line to elevate the line in the water. A disadvantage of typical fish stringers is that the needle has no real safe way to be stored when not in use. The needle is usually very sharp and can cause unintended damage to the fisherman. However, using a dull needle to avoid harm to one's self can become difficult to operate and work on a fish. Another issue with conventional stringers is the manner in which they are coupled to the vessel or fisherman. Given that the needle end remains with the vessel or fisherman, a safe way to operate, store, and attach the needle section is greatly needed. Conventional stringer designs do not hold the stringer securely or allow one-handed operation or keep the point secure. Additionally, typical stringers are made from a plastic material that frequently cracks and/or breaks around the base of the needle.

Although great strides have been made with respect to storing fish before they can be cleaned and prepared, considerable shortcomings remain. A new fish stringer is needed to permit safe storage and operation of a stringer needle as well as an improved method of attaching the stringer line to the floatation device. A further need is for a fish stringer capable of attachment to a variety of objects and is operable with a single hand.

SUMMARY OF THE INVENTION

It is an object of the present application to provide a stringer assembly for the safe storage of fish caught by a fisherman. The assembly is partially routed through a portion of the fish to keep it secured and in control by the fisherman. The stringer assembly of the present application is configured to prevent the pushing of slack in the line of the stringer in a manner to dislodge or uncouple the stringer line. Additionally, the stringer line is secured without clamping or tying of the stringer line.

It is a further object of the present application to provide a fishing stringer holder or attachment device that facilitates one handed operation to secure stringer line and safely store the needle such that the tip is partially concealed. The stringer line is bent over adjacent the needle when secured in the holder. Tension in the line and resistance to flexing hold the line in such an orientation.

It is another object of the present application to provide a floatation device that is removable from the stringer line. The stringer line is releasably coupled to the floatation device by merely looping the stringer line through the floatation device one or more times. A tip of the stringer line is secured within the floatation device.

The method of using the assembly is simplified in that a fisherman passes the stringer line, needle first, through a portion of a fish. The needle is inserted into the holder and the stringer line is folded adjacent the needle and lodged in a secured manner without fasteners. The holder is releasably secured to the fisherman or a water vessel with a clip. The floatation device is secured on the end of the stringer line opposite the needle without fasteners Ultimately the invention may take many embodiments but features the ability to create safety first and foremost and provide one handed operation and stowage of the needle in a stringer assembly without the need of fasteners. In this way, this assembly overcomes the disadvantages inherent in the prior art.

The more important features of the assembly have thus been outlined in order that the more detailed description that follows may be better understood and to ensure that the present contribution to the art is appreciated. Additional features of the assembly will be described hereinafter and will form the subject matter of the claims that follow.

Many objects of the present assembly will appear from the following description and appended claims, reference being made to the accompanying drawings forming a part of this specification wherein like reference characters designate corresponding parts in the several views.

Before explaining at least one embodiment of the assembly in detail, it is to be understood that the assembly is not limited in its application to the details of construction and the arrangements of the components set forth in the following description or illustrated in the drawings. The assembly is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and assemblies for carrying out the various purposes of the present assembly. It is important, therefore, that the claims be regarded as including such equivalent constructions insofar as they do not depart from the spirit and scope of the present assembly.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
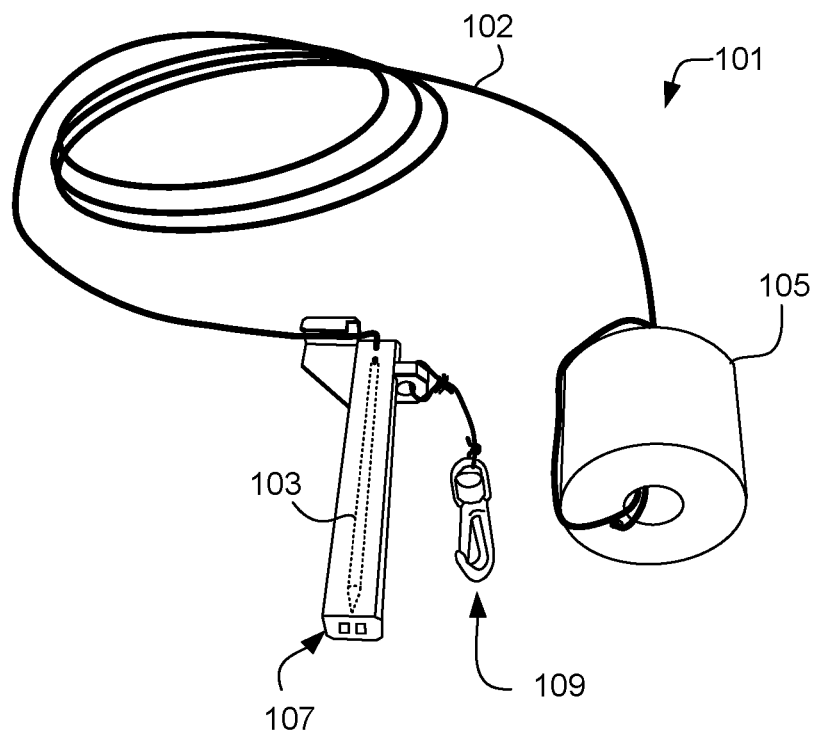
FIG. 1 is a perspective view of a fish stringer assembly according to an embodiment of the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with assembly-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the assembly described herein may be oriented in any desired direction.

The assembly and method in accordance with the present application overcomes one or more of the above-discussed problems commonly associated with methods and manners of dealing with fish between the time of catching the fish to the time of cleaning and preparing the fish. Specifically, the fish stringer assembly of the present application is configured to provide a safe method of storing the needle when to a holder without the need of fasteners. The assembly is configured to permit for the one-handed operation of the needle within a holder. Furthermore, the assembly is configured to secure the line to the floatation device without the use of a knot or other fastener. These and other unique features of the device are discussed below and illustrated in the accompanying drawings.

The assembly and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The assembly and method of the present application is illustrated in the associated drawings. The assembly of the present application includes a stringer line having a needle at a first end, a floatation device, and a holder which includes an attachment device. The holder is releasably coupled to a water vessel or fisherman through an attachment member configured to prevent twisting of the stringer line. The needle is inserted into a portion of the holder and the stringer line is routed under an external portion of the holder in a manner that binds the stringer line to the holder and prevents removal of the needle from within the holder. The line is immediately angled relative to the needle and wedged under a flange of the holder. Wedging of the line in an angled orientation creates a binding force within the line against the flange and prevents dislodging of the line from the flange. Because no fasteners are needed to operate the stringer line relative to the floatation device and holder, a fisherman is capable of operating the assembly with a single hand. Additional features and functions of the device are illustrated and discussed below.

Referring now to the Figures wherein like reference characters identify corresponding or similar elements in form and function throughout the several views. The following Figures describe the assembly of the present application and its associated features. With reference now to the Figures, an embodiment of the modular observation assembly and method of use are herein described. It should be noted that the articles "a", "an", and "the", as used in this specification, include plural referents unless the content clearly dictates otherwise.

Figure 2:
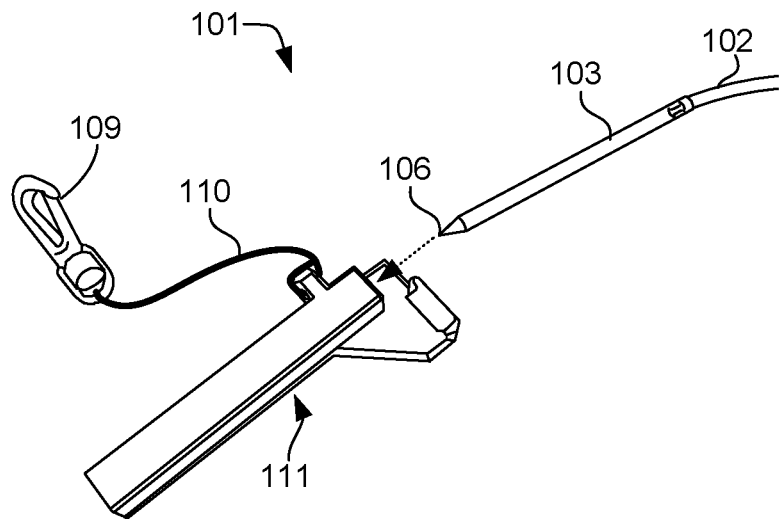
FIG. 2 is an enlarged perspective view of a holder and needle in the fish stringer assembly of FIG. 1.

Referring now to FIGS. 1 and 2 in the drawings, a fish stringer assembly 101 is illustrated. Assembly 101 includes a stringer line containing a line 102 and a needle 103, a floatation device 105 and a holder 107. Assembly 101 is used to tie or secure one or more fish to a fishing water vessel in a manner that keeps the fish in the water. This allows the fisherman to eliminate the need for a cooler or live well to hold the fish.

Holder 107 includes a main body 111 (see FIGS. 3 and 4) and an attachment device 109 to secure the needle 103 in a safe and protected manner. Attachment device 109 is used for coupling the stringer line, line 102 and needle 103, to a secured body, such as a water vessel or a fisherman. As seen in FIG. 1, a first end of line 102 is coupled to needle 103 and a second end of line 102 is coupled to floatation device 105. FIG. 2 provides a better view of needle 103. As seen in FIG. 1, the stringer line is detachable from the holder 107 to permit fish to be inserted onto the stringer line. Holder 107 prevents harm from incidental contact with a point 106 of the needle 103.

As stated above, stringer line includes line 102 and needle 103 wherein needle 103 is coupled to a first end of line 102 and floatation device 105 is coupled to a second end of line 102. Line 102 is configured to pass through one or more fish and thereby keep them from swimming away or floating away. In particular, needle 103 is used to puncture through a portion of the fish body. The fish may be alive or dead when attached to line 102. Line 102 is configured to remain in the water so as to allow the fish to remain alive while the fisherman continues to fish.

It is desired that line 102 remains near the surface of the water. This is done via use of floatation device 105 at the second end and attachment of holder 107 to either the water vessel or the fisherman near the surface adjacent the first end. One or more floatation devices may be spaced along line 102 (i.e. in between fish) to provide additional buoyancy. Line 102 may be made from any flexible material. Plastic materials are considered suitable. Other options may include natural elements such as rope, a nylon, or a woven and braided fabric. Needle 103 may be made from many types of materials including metallic materials and materials that are not susceptible to rust.

As seen more clearly in FIG. 2, needle 103 is configured to attach to line 102. The method of connection between these two parts can lead to line 102 breaking or cracking as line 102 is flexed. Needle 103 is crimped onto line 102 but may further include a flared end, swiveled coupling joint, or other connecting method to ease tensions that arise from flexing line 102 in an angled relation to needle 103 and avoid accidental cutting of the line at the junction of the two. It is also noted that the tip of needle 103 may be improved so as to be formed from more resilient materials that resist dulling from use.

Figure 3:
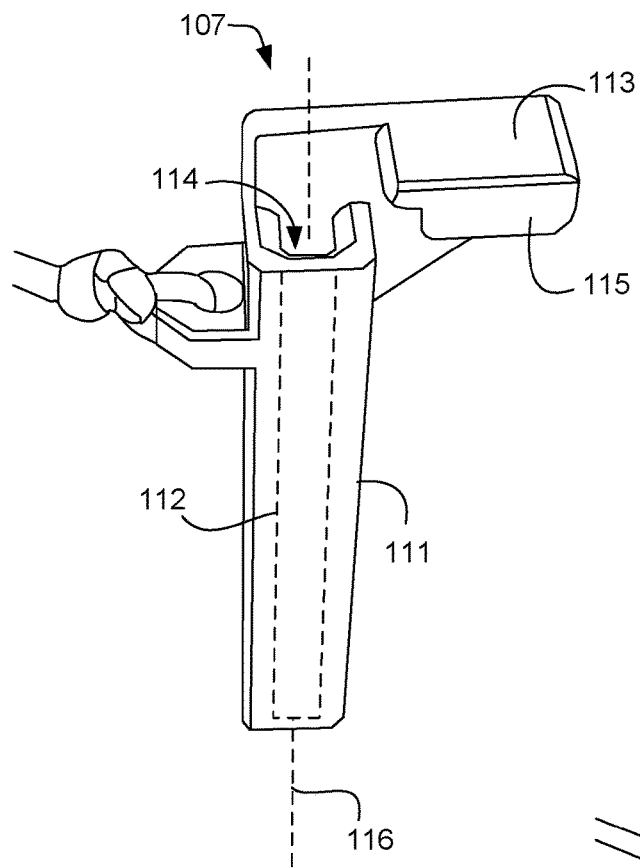
FIGS. 3 and 4 are enlarged perspective views of the holder of FIG. 2.
Figure 4:
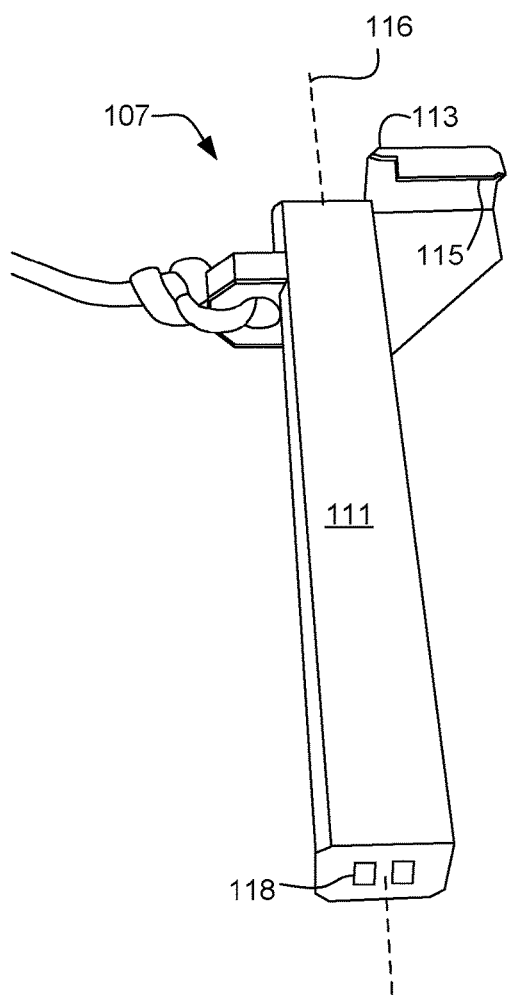

Referring now also to FIGS. 3 and 4 in the drawings, associated enlarged perspective views of holder 107 are illustrated. Holder 107 includes attachment device 109. Device 109 is configured to releasably attach main body 111 to the water vessel or the fisherman. Device 109 can be operable in any number of ways. As seen in the figures, attachment device 109 may include a line 110 and a clasp. Attachment device 109 is releasably coupled to main body 111 via line 110. The clasp can selectively open and close so as to grasp a portion of the water vessel. A swivel joint is included between the line 110 and the clasp to prevent twisting. The line 110 is coupled to main body 111 and also serves a use in storing assembly 101 when not in use. For example, when not in use, line 102 may be looped on itself (see FIG. 1). Line 110 may be wrapped around the loops of line 102 and the clasp may be opened so as to grasp line 102 or line 110. Doing this keeps the loops of line 102 together and holder 107 close to line 102.

Main body 111 is configured to house needle 103 in a secure manner to prevent line 102 from separating from the water vessel. Additionally, main body 111 is configured to provide protection from the needle point 106 for safety reasons. A fisherman does not want to be punctured or cut from needle 103 especially after passing through one or more fish. This can create a health concern. Holder 107 includes main body 111 and a flange 113. Body 111 includes a hollowed sleeve 112 passing longitudinally through main body 111 and is lengthened to match the approximate length of needle 103. Sleeve 112 defines a longitudinal axis 116, which is preferably concentric with main body 111. Sleeve 112 has an opening 114 near the top to accept needle 103. The bottom end of body 111 is configured to restrict the passage of needle 103 and is closed apart from the use of an aperture 118. Aperture 118 is configured to allow water to drain from within sleeve 112. It is a goal of holder 107 to keep needle 103 secured at all times.

Flange 113 is adjacent opening 114 of sleeve 112 and is configured to extend for a length or distance in a direction relatively perpendicular to axis 116 or relatively planar to opening 114. Flange 113 is oriented and positioned so as to not overlap, obstruct, or cover the opening 114. Additionally, flange 113 is elevated above the opening such that the opening 114 and flange 113 are not coplanar. This gap created between the plane flange 113 and the opening is used to locate line 102. In operation, needle 103 is designed to translate down through sleeve 112. To prevent needle 103 from pulling back out, line 102 is angled or folded over through opening 114 and across an edge of sleeve 112 so as to route line 102 under flange 113 within the gap between the plane of flange 113 and the plane of opening 114. This orienting can be seen in FIG. 1. In this position, the forced angled orientation of line 102 creates a tension within line 102 which causes line 102 to push upward against the surface of flange 113. In general, needle 103 is located vertically within body 111 and line 102 is horizontally secured underneath flange 113. Flange 113 may also include tab 115 which is configured to ensure that line 102 does not slip around flange 113. An advantage of holder 107 is that a fisherman may secure and release needle 103 from body 111 with a single hand. It is understood that the particular shapes depicted for holder 107 are not herein meant to be limiting. Of importance is that holder 107 secures line 102 at an angle relative to needle 103 while sheathed in rigid body 111.

Figure 5:
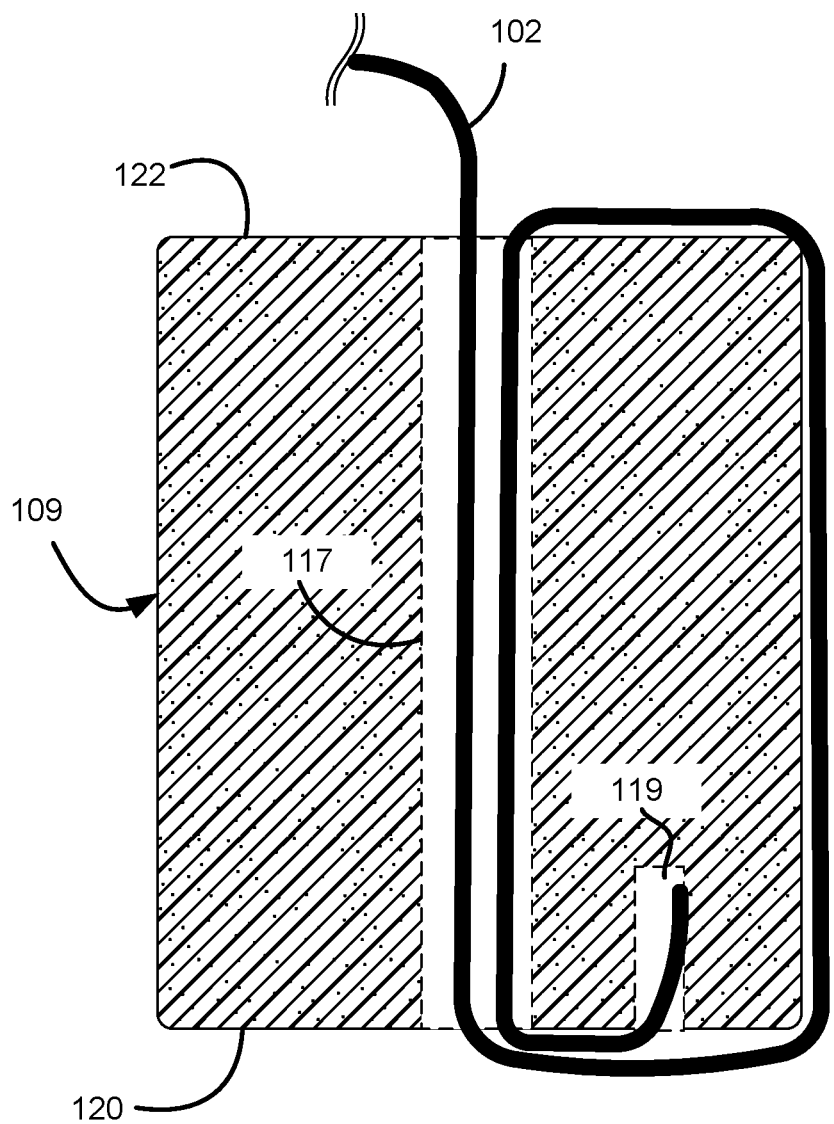
FIG. 5 is an enlarged section view of a floatation device in the fish stringer assembly in FIG. 1.

Referring now also to FIG. 5 in the drawings, an enlarged perspective view of floatation device 109 is illustrated. Floatation device 109 is configured to attach to the second end of line 102 and float on the surface of the water. This keeps line 102 at or near the surface of the water. Device 109 is configured to have a central channel 117 and a hole 119. Central channel 117 passes all the way through device 105 from a top surface 122 to a bottom surface 120. Device 109 may be releasably secured to line 102 without the need of knots, fasteners, clamps, or the like. Line 102 is passed through channel 117 and wrap around device 105. This is seen in FIG. 5 where line 102 is looped around and passed through device 105 a plurality of times. Bore 119 is located on bottom surface 120. The end of line 102 is adjacent bore 119 after being looped through channel 117. The end of line 102 is then folded over and inserted into bore 119. Bore 119 works to secure line 102 through interference fit, such that when coupled with the looping of line 102 through channel 117, prevents line 102 from separating from device 109. In a similar manner to securing needle 103 in sleeve 112, the bending of line 102 and insertion thereof into bore 119 creates a force between line 102 and internal surfaces of bore 119 to prevent slippage and accidental removal.

The current application has many advantages over the prior art including at least the following: (1) ability to secure the stringer assembly with a single hand; (2) concealment of the point of the needle to prevent injury; (3) safe, fast, and easy to operate; and (4) no need for fasteners.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A modular observation assembly, comprising:
    a stringer line having a needle and a line, the needle coupled to the line;
    a floatation device secured to the line opposite that of the needle; and
    a holder configured to releasably house the needle within a main body, the holder including:
        a hollowed sleeve with an opening for passage of the needle, the hollowed sleeve defining a longitudinal axis, the needle having a closed end opposite the opening to restrict exposure of a point on the needle;
        a flange oriented perpendicular to the longitudinal axis of the hollowed sleeve, the flange further located both above the opening and offset from the opening to avoid covering the opening so as to permit the needle to enter the hollowed sleeve;
    wherein the line is located between the hollowed sleeve and the flange when the needle is seated in the hollowed sleeve, the line is folded over from the opening and under the flange such that the stinger line is pushed upward against the flange thereby creating a tension on the stringer line sufficient to hold the position of the needle in the sleeve.

2. The assembly of claim 1, wherein the needle is crimped onto the line to avoid cutting the line when bent around the needle.

3. The assembly of claim 1, wherein the needle is a metallic member having an elongated body and a singular point opposite the line.

4. The assembly of claim 1, wherein the holder includes an attachment member.

5. The assembly of claim 4, wherein the attachment member releasably couples the holder to a water vessel.

6. The assembly of claim 4, wherein the attachment member releasably couples the holder to a fisherman.

7. The assembly of claim 4, wherein the attachment member is releasably coupled to the main body.

8. The assembly of claim 4, wherein the attachment member is tied to the main body.

9. The assembly of claim 1, wherein the act of securing and removing the needle from within the sleeve can be performed via a single hand of a user.

10. The assembly of claim 1, wherein securing of the needle within the main body is done without fasteners.

11. The assembly of claim 1, wherein the opening of the sleeve is unobstructed by the flange.

12. The assembly of claim 1, wherein the floatation device is configured to float in water and elevate the line toward the surface of the water, the floatation device includes a central channel passing therethrough, the line configured to pass through the central channel and wrap around the floatation device.

13. The assembly of claim 12, wherein the line passes through the central channel a plurality of times.

14. The assembly of claim 12, wherein a second end of the line being inserted into a bore in the floatation device, the second end of the line being opposite the first end, the first end being adjacent to the needle.

15. The assembly of claim 1, wherein the hollowed sleeve includes an aperture to permit drainage of water within the sleeve.

16. A method of securing fish, comprising:
    obtaining a stringer line having a needle and a line, the needle coupled to a first end of the line;
    routing the needle through one or more fish;
    locating the needle in a main body of a holder such that a point of the needle passes an opening of the main body first, the holder including:
        a hollowed sleeve with an opening for passage of the needle, the hollowed sleeve defining a longitudinal axis, the needle having a closed end opposite the opening to restrict exposure of a point on the needle; and
        a flange oriented perpendicular to the longitudinal axis of the hollowed sleeve, the flange further located both above the opening and offset from the opening to avoid covering the opening so as to permit the needle to enter the hollowed sleeve;
    securing the needle in the main body by angling the line relative to the needle adjacent the opening and wedging the line under a flange of the main body to maintain the angled orientation, line is located between the hollowed sleeve and the flange when the needle is seated in the hollowed sleeve, the line is folded over from the opening and under the flange such that the stinger line is pushed upward against the flange thereby creating a tension on the stringer line sufficient to hold the position of the needle in the sleeve; and
    securing the main body to at least one of a water vessel and a fisherman by operating an attachment member coupled to the main body.

17. The method of claim 16, wherein securing of the needle within the holder is performed with a single hand.

* * * * *